(12) United States Patent
Sakazaki et al.

(10) Patent No.: US 7,267,373 B2
(45) Date of Patent: Sep. 11, 2007

(54) CONNECTING STRUCTURE FOR A FLUID TRANSPORT HOSE

(75) Inventors: Kazushige Sakazaki, Komaki (JP); Koji Hioki, Itinomiya (JP)

(73) Assignee: Tokai Rubber Industries, Ltd. (JP)

( * ) Notice: Subject to any disclaimer, the term of this patent is extended or adjusted under 35 U.S.C. 154(b) by 134 days.

(21) Appl. No.: 11/067,114

(22) Filed: Feb. 25, 2005

(65) Prior Publication Data

US 2005/0230971 A1    Oct. 20, 2005

(30) Foreign Application Priority Data

Mar. 30, 2004  (JP)  ............................. 2004-101394

(51) Int. Cl.
*F16L 33/00*  (2006.01)
(52) U.S. Cl. .................. 285/253; 285/252; 285/222.1
(58) Field of Classification Search ................ 285/252, 285/253, 241, 222.2, 222.1
See application file for complete search history.

(56) References Cited

U.S. PATENT DOCUMENTS

| | | | | |
|---|---|---|---|---|
| 1,227,690 | A * | 5/1917 | Subers ......................... | 285/253 |
| 5,568,944 | A * | 10/1996 | Kawasaki ................... | 285/21.1 |
| 5,664,608 | A * | 9/1997 | Kawasaki .................... | 138/139 |
| 6,607,218 | B2 * | 8/2003 | Sakazaki et al. ............ | 285/226 |
| 6,712,098 | B2 * | 3/2004 | Sakazaki et al. ............ | 138/109 |

2002/0017787 A1   2/2002 Sakazaki et al.

FOREIGN PATENT DOCUMENTS

| | | | | |
|---|---|---|---|---|
| EP | 1180633 | * | 2/2002 | .................. 285/241 |
| JP | 08-294979 | | 11/1996 | |
| JP | 2002-54779 | | 2/2002 | |

OTHER PUBLICATIONS

Patent Abstract of Japan for Japanese Patent Application Publication No. 08-294979, published Nov. 12, 1996, and English translation.
Patent Abstract of Japan for Japanese Patent Application Publication No. 2002-054779, published Feb. 20, 2002, and English translation.

* cited by examiner

*Primary Examiner*—David Bochna
(74) *Attorney, Agent, or Firm*—Andrus, Sceales, Starke & Sawall, LLP

(57) ABSTRACT

On the inner surface of a rubber hose body 12, a laminated hard resin layer 14 is formed to constitute a barrier layer that is impermeable to fluids. A clamping connection is made to hose 10 by a clamping member 24, which clamps the hose body to a companion pipe 18 when the companion pipe is inserted into the hose body. The layer 14 is not laminated over the entire axial length of the hose body but instead leaves an end part exposed. An annular groove is formed at the end 36 of the layer 14 abutting the end part of the hose 10. An elastic impermeable material is placed in the groove which is compressed by the pipe upon insertion. The companion pipe 18 has a protuberance 22 which rests at a position between the end 36 of resin layer 14 and the clamping member so that a seal is formed by elastic compression of the outer surface of companion pipe 18 against the end part of the hose.

7 Claims, 5 Drawing Sheets

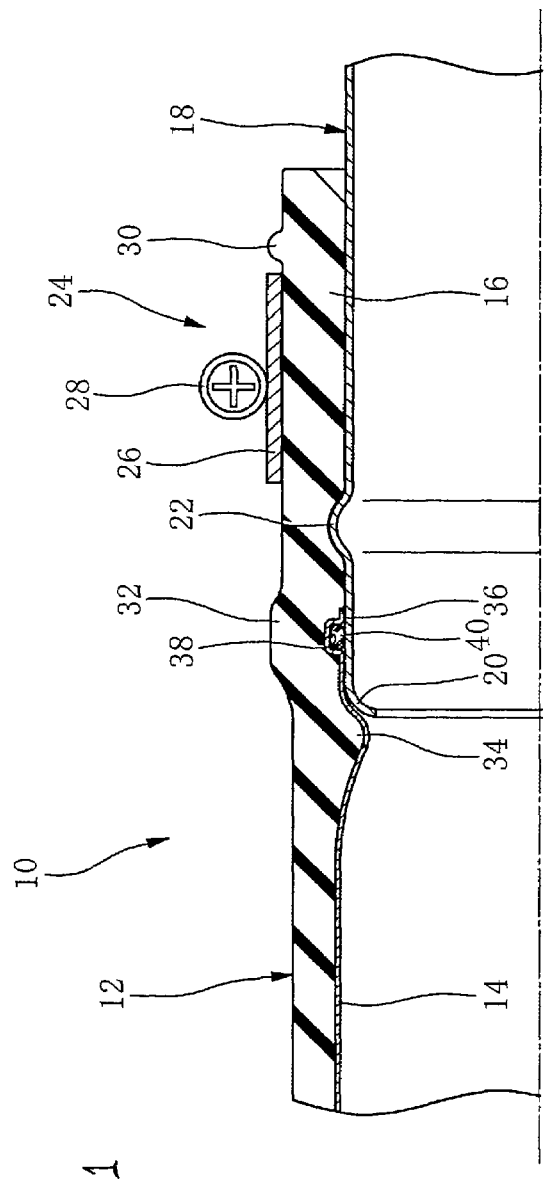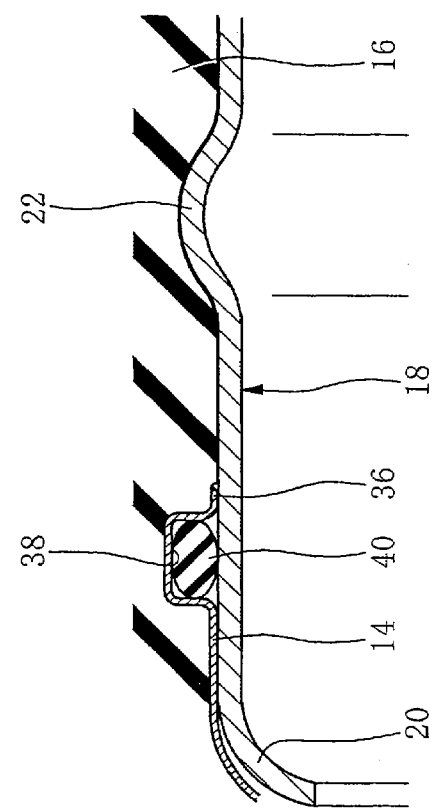

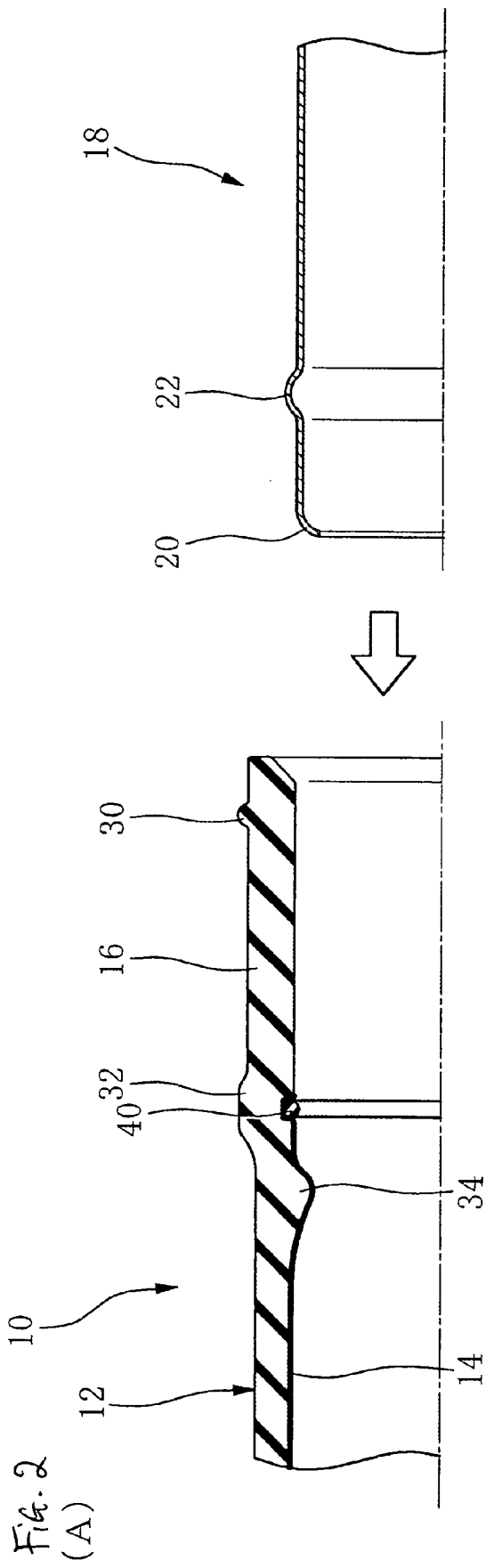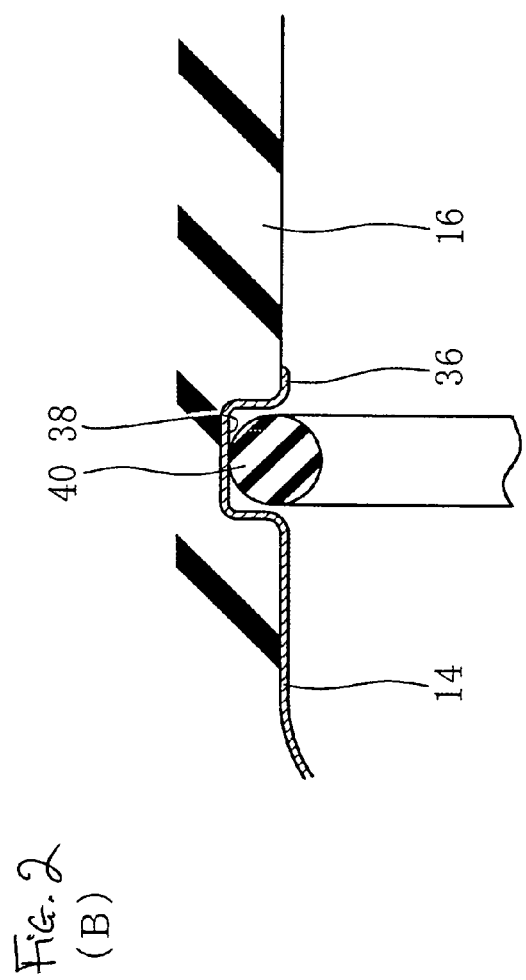
Fig. 2 (A)
Fig. 2 (B)

(A)

(B)

CONNECTING STRUCTURE FOR A FLUID TRANSPORT HOSE

TECHNICAL FIELD

The present invention concerns a connecting structure for a fluid transport hose that is suitable for use in an automobile as a fuel supply hose.

BACKGROUND ART

Heretofore, the hose used to transport fuel in an automobile has been an ordinary rubber hose, for example NBR•PVC (blend of acrylonitrile butadiene rubber and poly(vinyl chloride) with good vibration absorbency and ease of attachment. This hose has, at present, a gasoline impermeability which satisfies government regulations but automotive fuel permeability regulations are becoming stricter from the perspective of global environmental conservation in recent years, and it is anticipated that these regulations will be increasingly stringent in the future.

In order to satisfy past fuel impermeability, requirements a configuration was used in which a laminated layer of a hard resin possessing impermeability to fuel was formed on the inner surface of a hose body to function as a fuel permeability barrier layer comprising an elastic body.

However, because a resin layer possessing fuel impermeability has the material properties of a hard layer, where the laminated layer formed on the inner surface reaches to the end of the hose body shaft and a rigid companion pipe such as a metal pipe is inserted directly to impact the inner surface, if there is inadequate sealability between the companion pipe and the fuel transport hose or more specifically the resin layer on the inner surface, or if a strong force is necessary when inserting the companion pipe into the opening at the end of the hose shaft deterioration of the hose body and other problems may arise.

Because of this, a connecting structure has been suggested previously as is described in Japanese Unexamined Patent Application Publication (Kokai) No. H8-294979. corresponding to FIG. 5(A).

The fuel supply hose 200 of FIG. 5A (referred to hereafter simply as a hose) includes a rubber hose body 202, and a hard resin layer 204 formed as a laminated layer on the inner surface of the hose body 202 to function as a permeation barrier layer possessing fuel impermeability. The resin layer 204 is laminated over the entire inner surface of the hose body 202.

In this connecting structure, as shown in FIG. 5(A), the inner surface of resin layer 204 is provided with rubber seal 206 possessing fuel impermeability at an end part 212 which is connected to a rigid companion pipe 208 (e.g., as shown in FIG. 5B) when the rigid companion pipe 208 is inserted into resin layer 204 in contact with rubber seal 206, so that the two are fitted together.

With this connecting structure, there is relatively good sealability when companion pipe 208 is directly inserted against resin layer 204.

However, even with rubber seal 206 positioned in between the companion pipe 208 and the end part 212, a strong force is necessary when inserting companion pipe 208 into resin layer 204 because the structure requires the insertion of companion pipe 208 to resin layer 204, and a problem with workability can still arise during the hose connection.

Another connecting structure is described in Japanese Unexamined Patent Application Publication (Kokai) No. 2002-54779 which ameliorates some of the above problems.

Concrete examples of this structure are shown in FIGS. 5(B) and (C).

In the connecting structure shown in FIG. 5(B), resin layer 204 is not formed on end part 212 of hose body 202 leaving the end part 212 completely exposed and causing the inner surface of hose body 202 to make elastic contact directly with the outer surface of companion pipe 208.

In addition a ring-shaped recess 214 is formed in the end part 212 at the inner surface thereof in the vicinity of leading edge 205 of resin layer 204 so that fuel from the part of the interior will not permeate to the exterior of hose body 202, and a fuel-impermeable elastic sealing material 216 is inserted into the recess 214 so that the companion pipe 208 can make contact with the inner surface of elastic sealing material 216 when installing the companion pipe 208.

The elastic sealing material 216 is contained internal of the recess 214 as more clearly shown in FIG. 5(C).

A ring-shaped protuberance 210 is also formed at the insertion end of the companion pipe 208 in the radial direction outwardly from the leading edge of the insertion end of the companion pipe 208. The protuberance 210 is intended to exert elastic compression in the radial direction outwardly against elastic sealing material 216 as it penetrates the interior.

Furthermore, the extent of insertion adjacent to the leading edge of companion pipe 208 along the axial direction at the inner surface of hose 200 is regulated by protruding part 218 formed in the downward direction in the Figure, in other words in the radial direction inwards.

A clamping member 220 is placed over the end part 212 of hose body 202 to clamp the outer surface of the hose body to the companion pipe 208.

The clamping member 220 includes a belt-shaped tightening member 222 and a tightening mechanism 224.

In this connecting structure, since resin layer 204 is not formed on the inner surface of end part 212 of hose body 202, when companion pipe 208 is inserted inward through the opening of the end of the shaft of hose 200, it is possible to carry out the insertion easily with little force compared with the connecting structure shown in FIG. 5(A).

Moreover, because of the configuration in which the inner surface of elastic hose body 202 at end part 212 is directly in contact with the outer surface of companion pipe 208, it is possible to achieve a good seal for fitting hose 200 together with companion pipe 208.

Naturally, since the resin layer 204 is formed on the inner surface of hose body 202 but not on the end part 212 of the hose body 202 a concern arises that fuel on the inside will be able to permeate through hose body 202 to the exterior.

Consequently, impermeable elastic sealing material 216 is provided between the leading edge of companion pipe 208 and hose 200, which will prevent the fuel on the inside from reaching end part 212 between the outer surface of companion pipe 208 and the inner surface of hose 200.

From this it is possible to satisfactorily prevent the fuel on the inside from permeating to the exterior through to end part 212.

However, with this hose connecting structure, when companion pipe 208 is inserted inward through the opening at the end of the shaft of hose 200, protuberance 210 in the radial direction outwards must be inserted past leading edge 205 of hard resin layer 204 on the left side in the Figure, and significant resistance will be encountered in doing so.

Accordingly, even in this connecting structure, there is still room for further improvement in the workability when inserting companion pipe 208 and consequently in the workability of the connection to the hose.

Several examples of fuel transport hoses were explained above, but the difficulties in preventing the permeation of the transported fluid are shared in common by connecting structures for hoses that have laminated layers formed from resin layers that possess impermeability on the inner surface of an elastic hose body.

SUMMARY OF THE INVENTION

The connecting structure for a fluid transport hose of tubular geometry in accordance with the present invention comprises: a hollow hose body of an elastic material possessing impermeability toward transported fluids, an inner layer of a resinous material having a hardness greater than the hardness of the hose body, said inner layer being laminated along the inner surface of the hose body over a predetermined distance except for an end part of the hose body with the inner layer having a leading edge abutting the end part and with the end part of the hose body adapted to be connected to a rigid companion pipe having an insertion end upon insertion thereof into the end part, and a clamping member for clamping the hose to the companion pipe wherein, the connecting structure of the fluid transport hose further comprises an annular groove formed in the hose body and in the resin layer adjacent the leading edge of the resin layer and an elastic sealing material inserted into said groove and wherein the companion pipe includes a ring-shaped protuberance formed in the radial direction outwardly at a position separated along the axial direction from the insertion end of the companion pipe whereupon by insertion into the hose body the outer surface of the companion pipe exerts elastic compression in the radial direction outwardly against said elastic sealing ring, to form a seal between said companion pipe and the resin layer. The hose body further comprises two protuberances located on opposite sides of the clamping member such that the protuberance on said companion pipe when inserted into the hose body rests at a position between the leading edge of the resin layer and said clamping member.

In the present invention an elastic sealing ring is formed on the inner surface of the resin layer to form a seal between the fluid transport hose and the companion pipe. The elastic sealing ring is formed at a position such that the ring-shaped protuberance of the companion pipe is fastened to the elastic sealing ring upon its insertion into the hose body.

According to the present invention, the connecting structure permits the companion pipe to be inserted into the hose easily and with little resistance. For this reason, the workability of the hose connection can become favorable.

In addition, the clamping part of the clamping member is arranged to be behind the ring-shaped protuberance of the companion pipe when it is inserted into the hose such that the companion pipe cannot be pushed too far through the hose.

At the same time, since the elastic sealing ring is impermeable to the fluid being transported, when the interior transported fluid permeates to this elastic sealing ring, it is prevented from reaching the inner surface of the end part of the hose body that does not have a formed resin layer, and consequently it is satisfactorily prevented from permeating from the inner surface of the end part of the hose body that does not have a formed resin layer through to the exterior of the hose body.

In other words, an independent sealing function is provided by the elastic sealing ring with the respective functions of the protuberance and the elastic sealing ring. From the foregoing, the workability of the hose connection and the sealability are satisfactory, and both make it furthermore possible to maintain impermeability to the transported fluid.

In the present invention, the protuberance exerting elastic compression in the radial direction outward against the inner surface of the hose body enables it to penetrate into the inner surface of the end part.

BRIEF DESCRIPTION OF THE DRAWINGS

FIG. 1 shows the design of one embodiment of the present invention for a connecting structure of a fuel supply hose.

FIG. 2 shows the design of the same embodiment for the condition prior to connecting the hose and the companion pipe.

DETAILED DESCRIPTION OF THE PREFERRED EMBODIMENTS

Figure 3:
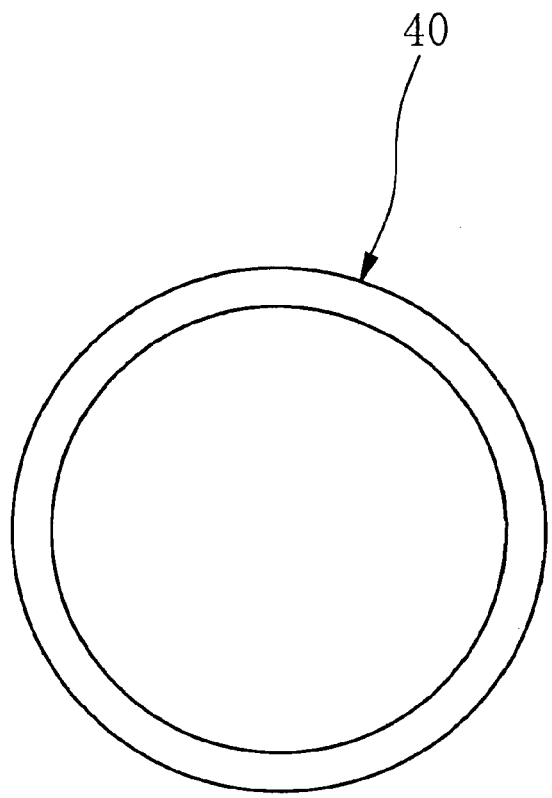
FIG. 3 shows the design of the same embodiment where an elastic sealing ring is employed.
Figure 3:
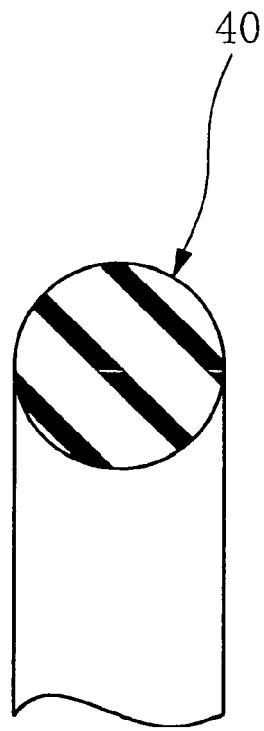

The following embodiments describe the connecting structure for use as an automotive fuel supply hose based on the drawings.

In FIG. 1, 10 is a fuel supply hose (hereafter referred to simply as hose), 12 is an elastic hose body constituting the main body, and 14 is a laminated layer formed on the inner surface of the body 12. The layer 14 is a hard resin layer that functions as a barrier layer possessing impermeability to fuel.

The resin layer 14 is not laminated over the end part 16 of the hose 10 leaving the inner surface of the end part 16 exposed.

A metal companion pipe 18 functions as a connection partner to the connecting structure and includes a straight tube section of cylindrical geometry extending along the axial direction and a curved end 20 at the leading edge thereof.

The outer diameter of the companion pipe 18 is not equivalent to the inner diameter of end part 16 but has a slightly larger diameter.

The curved bent end 20 of the companion pipe 18 is curved in the centripetal direction. The companion pipe 18, also has a protuberance 22 in a ring shape extending outwardly in the radial direction. The protuberance 22 is formed at a position separated along the axial direction from the curved end 20.

A clamping member 24 is fastened and clamped against companion pipe 18 to ensure that the inner surface of the end part 16 makes elastic contact with the outer surface of companion pipe 18.

The clamping member 24 includes a belt-shaped tightening member 26 and a tightening mechanism 28.

The outer surface of the hose 10 has ring-shaped protruding parts 30, 32, located on the opposite ends of the end part 16 with the clamping member 24 positioned in between the protruding parts 30, 32.

In addition the hose 10 is provided with a protruding part 34 spaced a predetermined distance from the end or leading edge 36 of the laminated layer 14 such that when the companion pipe 18 is inserted into the hose 10 the protruding part 34 will act to regulate the extent of insertion of the leading edge of companion pipe 18, i.e., the curved end 20.

As shown in detail in FIG. 1(B) as well as in FIG. 2 when the companion pipe 18 inserted into the hose 10 the protuberance 22 of companion pipe 18 lies to the right of leading edge 36 of resin layer 14, and specifically is positioned between the leading edge 36 and the clamping part 26 of the clamping member 24, for exerting elastic compression in the radial direction outward against the inner surface of hose body 12 and penetrating against the inner surface of hose body 12.

FIG. 1(B) shows in detail a ring-shaped groove 38 is formed as a concavity in the body and resin layer in the vicinity of leading edge 36 of resin layer 14 extending radially outwardly therefrom. An elastic O-ring (elastic sealing ring) 40 is installed in the groove 38 as shown in FIG. 3

As shown specifically in FIG. 2(B), before the companion pipe 18 is inserted, the inner peripheral edge of O-ring 40 protrudes in the radial direction inward from ring groove 38, i.e., into the hollow tubular opening of the hose body.

The ring groove 38 possesses substantially the same inner diameter as the inner surface of end part 16, and consequently O-ring 40 protrudes in the radial direction inward from the inner surface of end part 16 prior to the insertion of companion pipe 18.

Thus, when companion pipe 18 is inserted along the axial direction into the opening of the end of the shaft of hose 10, O-ring 40 undergoes a compressive change in the radial direction outward due to the outer surface of companion pipe 18, and in this state a satisfactory seal is formed between the outer surface of companion pipe 18 and the inner surface of hose 10, more specifically the inner surface of resin layer 14.

Here, O-ring 40 will be constituted of a material that possesses impermeability to fuel.

In the present embodiment, examples of suitable materials that can be used for hose body 12 include fluoro-rubber (FKM), acrylonitrile butadiene rubber (NBR), a blend of acrylonitrile butadiene rubber and poly(vinyl chloride) (NBR•PVC), hydrogenated acrylonitrile butadiene rubber (H-NBR), and epichlorohydrin rubber (ECO).

Moreover, examples of suitable materials that can be used for resin layer 14 with impermeability to fuel include poly(vinylidene fluoride) and vinylidene fluoride copolymer resins (for example the copolymer resin of vinylidene fluoride with chlorotrifluoroethylene) or polyester resins (for example poly(butylene naphthalate), poly(butylene terephthalate)).

In addition, examples of suitable materials that can be used for O-ring 40 with impermeability to fuel include FKM, NBR, NBR•PVC, H-NBR, and ECO.

In the present embodiment, companion pipe 18 can be connected with hose 10 in the following way.

In other words, as shown in FIG. 2(A), companion pipe 18 is inserted into hose 10 through the opening of the end of the shaft of hose 10.

While it is being inserted inside, bend 20 at the leading edge of companion pipe 18 reaches the position of radially inward protruding part 34 of hose 10.

During this movement, protuberance 22 of companion pipe 18 does not pass over leading edge 36 of resin layer 14 formed as a laminated layer on the inner surface of hose body 12, so that it does not encounter significant resistance to insertion due to resin layer 14, and consequently companion pipe 18 can easily be inserted into hose 10 smoothly and with little force.

The insertion of companion pipe 18 together with the inner surface of hose 10, more specifically with O-ring 40 maintaining the attachment at ring groove 38 of the inner surface of resin layer 14, exerts elastic compression in the radial direction outwards due to the outer surface of companion pipe 18, to form a satisfactory seal between the outer surface of companion pipe 18 and the inner surface of resin layer 14.

Afterward, as shown in FIG. 1, leading edge 16 in hose 10 is constricted from the outer surface by clamping member 24 as a way to reduce the diameter, and leading edge 16 is fastened and clamped against companion pipe 18.

As a result of this, the protuberance 22 will rest positioned to the left of the clamping part from clamping member 24 in FIG. 1 following insertion of the companion pipe and between the protuberances 30 and 32 closer to protuberance 32.

With the hose connecting structure as in the embodiment above, companion pipe 18 can easily be inserted into hose 10 with little resistance since it is not necessary for protuberance 22 formed on companion pipe 18 to be inserted into hard resin layer 14.

For this reason, the workability of the hose connection can become favorable.

Moreover, because protuberance 22 is positioned behind the clamping part of end part 16 from the clamping member, the force exerted when pushing it through the hose may be high due to the strong resistance to being pushed through due to protuberance 22. In other words, the design can prevent it from being pushed too far through hose 10.

At the same time, the seal between companion pipe 10 and the inner surface of hose 10 can be made satisfactorily by using O-ring 40.

Because O-ring 40 also possesses impermeability to fuel, if the interior fuel permeates to O-ring 40, it will be prevented from reaching the inner surface of end part 16 of hose body 12 where resin layer 14 has not been formed, consequently it can more satisfactorily prevent fuel from permeating to the exterior through hose body 12 from the inner surface of end part 16 of hose body 12 where resin layer 14 has not been formed.

In other words, satisfactory workability of the hose connection and satisfactory sealability can be achieved by the present embodiment, both of which furthermore make possible the impermeability to fuel and prevent the companion pipe from pushing too far through the hose.

In the present embodiment, it is possible to use various other elastic sealing ring configurations in place of O-ring 40.

Figure 4:
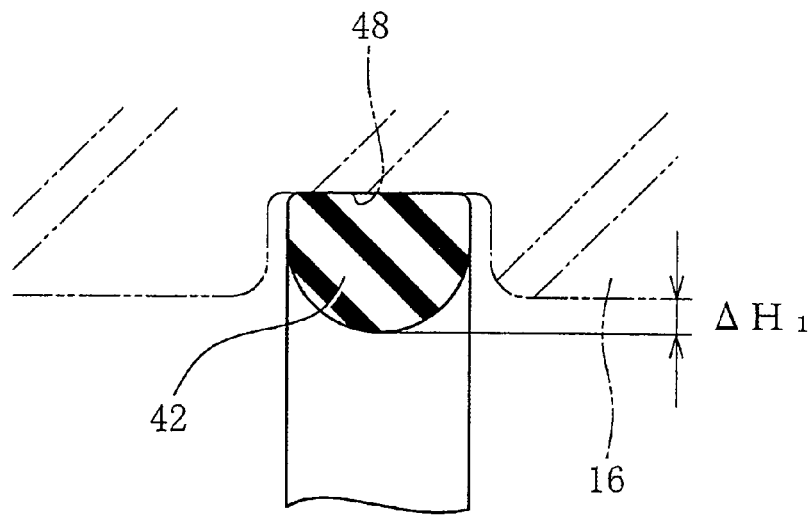
FIG. 4 shows the design from FIG. 3 with different forms of the elastic sealing ring.
Figure 4:
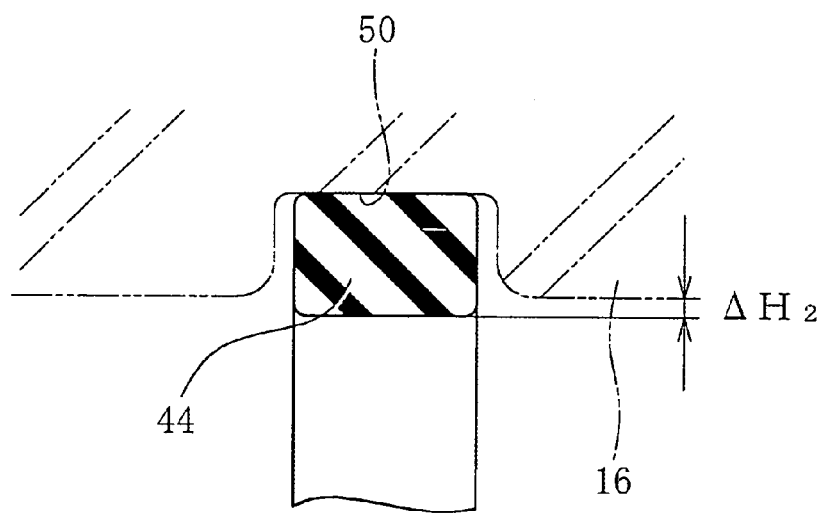
Figure 4:
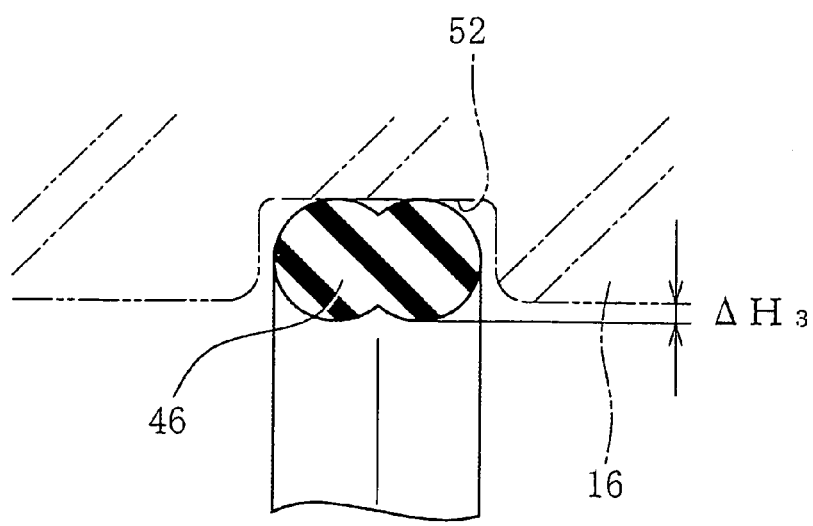
Figure 5:
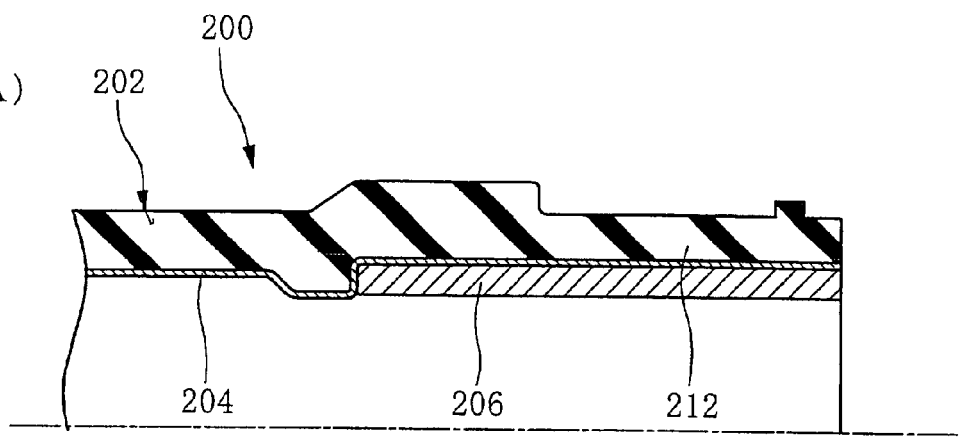
FIG. 5 shows the design of the connecting structure of the current fluid transport hose.
Figure 5:
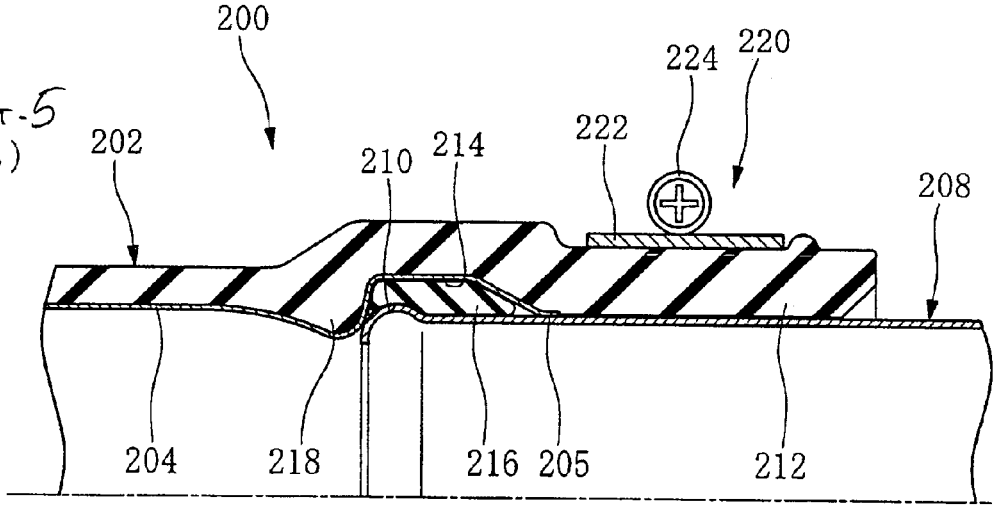
Figure 5:
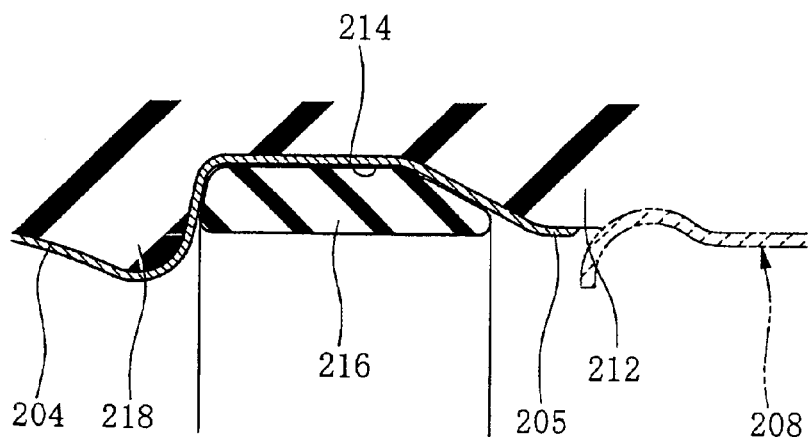

Some concrete examples are shown in FIG. 4.

Among these, FIG. 4(A) shows an example using elastic sealing ring 42 which has a D-shape in cross-section, moreover (B) shows an example using elastic sealing ring 44 which has a rectangular shape in cross-section, furthermore (C) shows an example using elastic sealing ring 46 which has a rotated figure-8 shape in cross-section.

In all of these cases, with elastic sealing ring 42, 44 or 46 mounted in corresponding ring groove 48, 50 or 52 prior to inserting companion pipe 18, the peripheral edge of these elastic sealing rings protrudes radially inward from ring groove 48, 50, or 52 or in other words from the inner surface of end part 16 only by the fixed distance ΔH1, ΔH2, or ΔH3, respectively.

In this embodiment, the elastic sealing rings can be constituted of any single material, but the exposed outer layer of the outer surface can only be constituted of a material that possesses impermeability to fuel, while the core can be constituted of some other material.

An embodiment of the present invention has been explained in detail, but only a single example is shown, and there are possible applications in connecting structures for types of hoses other than fuel supply hoses, and it is possible to constitute other configurations in which various modifications are made that do not exceed the scope of the present invention.

What is claimed is:

1. A connecting structure for a fluid transport hose of tubular geometry comprising:
    a hollow hose body of an elastic material possessing impermeability toward transported fluids, an inner layer of a resinous material having a hardness greater than the hardness of the hose body, said inner layer being laminated along the inner surface of the hose body over a predetermined distance except for an end part of the hose body, the inner layer having a leading edge abutting the end part of the hose body, the end part of the hose body adapted to be connected to a rigid companion pipe having an insertion end for insertion into the end part of the hose body, and a clamping member for clamping the hose to the companion pipe, and wherein,
    the connecting structure of the fluid transport hose further comprises an annular groove formed in the hose body and in the resin layer adjacent the leading edge of the resin layer and an elastic sealing ring inserted into said groove,
    said elastic sealing ring possessing impermeability to transported fluids, arranged in said annular groove to protrude inward of said inner layer surrounding said annular groove,
    the companion pipe including a ring-shaped protuberance extending in the outward radial direction at a position separated along the axial direction from the insertion end of the companion pipe, whereupon by insertion of the companion pipe into the hose body an outer surface of a portion of the companion pipe extending from the protuberance to the insertion end exerts elastic compression in the radial direction outwardly against said elastic sealing ring, to form a seal between said companion pipe and the resin layer;
    said clamping member is located on the end part of the hose body where the resin layer is removed, and
    the protuberance on said companion pipe rests between the leading edge of the resin layer and said clamping member when the insertion end of the companion pipe is inserted into the hose body.

2. The connecting structure for a fluid transport hose as recited in claim 1 wherein:
    said hose body further comprises two protuberances located on opposite sides of said clamping member on an outer surface of the hose body.

3. The connecting structure for a fluid transport hose as recited in claim 2 wherein said elastic sealing ring comprises an O ring.

4. The connecting structure for a fluid transport hose as recited in claim 2 wherein one of said protuberances is in substantial alignment with said annular groove of the resin layer.

5. The connecting structure for a fluid transport hose as recited in claim 4 wherein said hose and inner layer have another protuberance extending inwardly toward the hollow opening in the hose body at a position spaced inwardly in the axial direction from the annular groove of the resin layer for preventing the insertion end of the companion pipe from further movement within the hose body.

6. The connecting structure for a fluid transport hose as recited in claim 1 wherein said fluid transport hose is an automotive fuel supply hose.

7. The connecting structure for a fluid transport hose as recited in claim 5 wherein the insertion end of the companion pipe abuts the protuberance extending inwardly toward the hollow opening when inserted into the hose body.

* * * * *